United States Patent
Watanabe et al.

(10) Patent No.: US 8,637,832 B2
(45) Date of Patent: Jan. 28, 2014

(54) RADIOGRAPHIC IMAGE DETECTOR AND CONTROL METHOD THEREFOR

(75) Inventors: Keita Watanabe, Kanagawa (JP); Takeshi Kuwabara, Kanagawa (JP); Yasufumi Oda, Kanagawa (JP); Jun Enomoto, Kanagawa (JP); Takeshi Koishi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/480,136

(22) Filed: May 24, 2012

(65) Prior Publication Data

US 2012/0305791 A1   Dec. 6, 2012

(30) Foreign Application Priority Data

May 30, 2011   (JP) .................................. 2011-120459

(51) Int. Cl.
*G01T 1/00*   (2006.01)

(52) U.S. Cl.
USPC ........................................................ 250/394

(58) Field of Classification Search
USPC ................................ 250/394; 378/96, 97, 165
See application file for complete search history.

(56) References Cited

U.S. PATENT DOCUMENTS

2007/0221857 A1*   9/2007   Kobayashi et al. ...... 250/370.09

FOREIGN PATENT DOCUMENTS

JP   2005-143802 A   6/2005

* cited by examiner

*Primary Examiner* — David Porta
*Assistant Examiner* — Edwin Gunberg
(74) *Attorney, Agent, or Firm* — Studebaker & Brackett PC

(57) ABSTRACT

A flat panel detector has an imaging area, in which pixels are arrayed in a matrix and signal lines for reading out electric signals from the pixels are provided, to detect an image of a subject from x-rays which are incident on the imaging area after penetrating the subject. Detective elements are arranged in the imaging area, to output electric signals corresponding to incident x-rays. Based on previously stored sensitivity data on the detective elements, high-sensitivity elements are selected from among the detective elements. The start of radiation and the end of radiation of x-rays toward the imaging area are detected by monitoring the electric signals from the selected high-sensitivity elements, to control operation of the imaging device on the basis of the detected start and end of radiation.

10 Claims, 10 Drawing Sheets

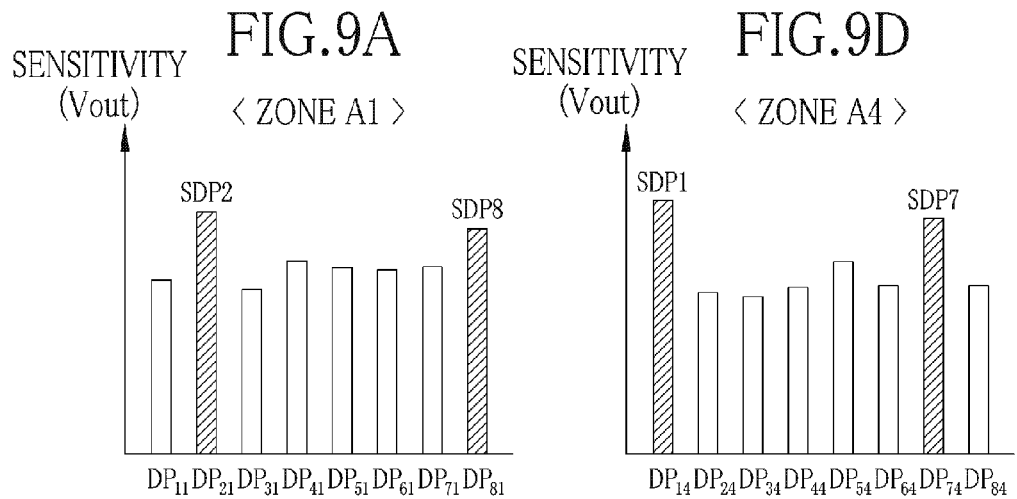
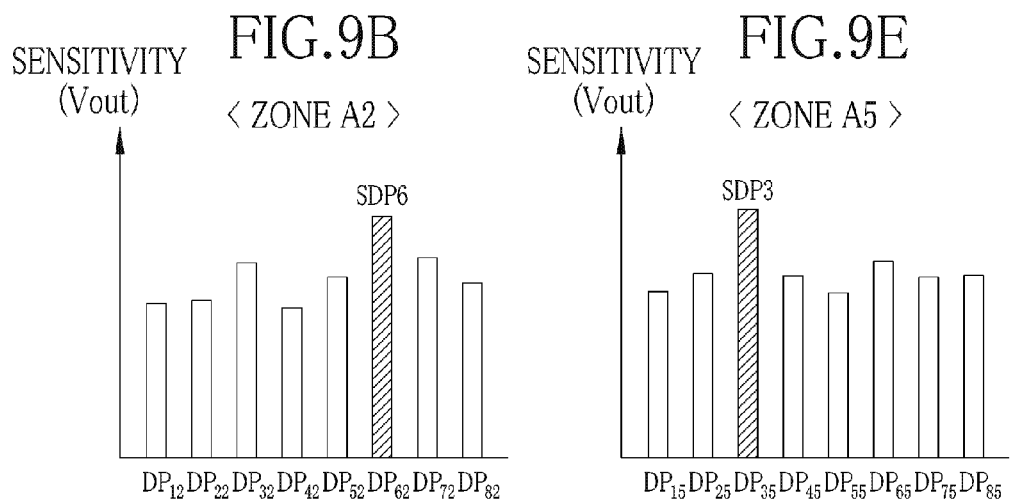
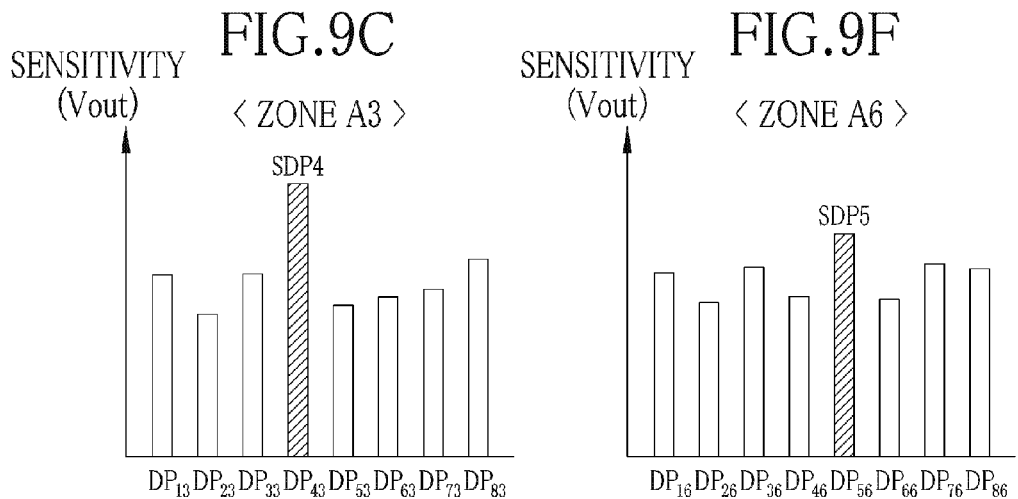

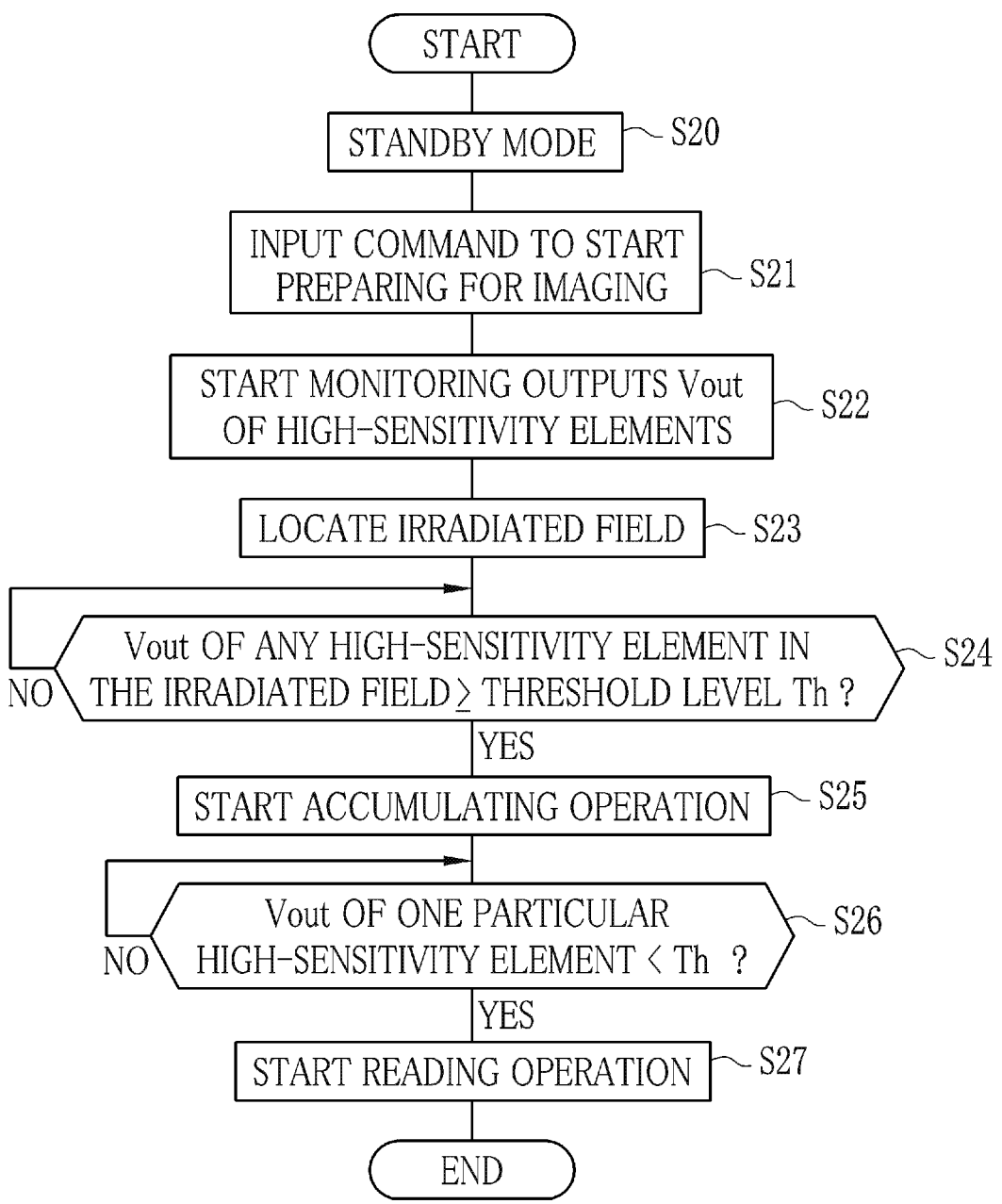

RADIOGRAPHIC IMAGE DETECTOR AND CONTROL METHOD THEREFOR

BACKGROUND OF THE INVENTION

1. Field of the Invention

The present invention relates to a radiographic image detector that detects an image of a subject from radioactive rays penetrating through the subject.

2. Description of the Related Art

In the medical field, radiography using radioactive rays like x-rays has been well known as a diagnostic method. An x-ray radiography system generally consists of an x-ray source for radiating x-rays and an x-ray image detector for detecting an x-ray image of a subject from x-rays penetrating through the subject. Among those used in practice, there is an x-ray image detector that adopts a flat panel detector (FPD). The FPD includes a TFT (thin film transistor) active matrix substrate, in which pixels (sensor elements) having a thin film transistor each are arranged in an array for accumulating signal charges in respective pixels corresponding to the amounts of x-rays incident thereon. The FPD outputs the accumulated signal charges in the form of digital image data representative of the x-ray image of the subject.

Unlike conventional x-ray image detectors using radiographic film or an imaging plate, the FPD type x-ray image detector needs to be controlled so as to synchronize its charge accumulating operation with the timing of x-ray radiation from the x-ray source. For this purpose, a control device for the x-ray image detector, like a console, is configured to receive a start-of-radiation signal from a radiation starting switch when the radiation starting switch is operated to actuate the x-ray source to start x-ray radiation. The control device transfers the start-of-radiation signal as a synchronizing signal to the x-ray image detector, upon which the x-ray image detector starts accumulating signal charges for the imaging.

However, when a radiography system adopts such an x-ray image detector that is produced by a different manufacturer from that of an x-ray source, the interface of the image detector may sometimes be incompatible to the interface standards of a control device for the x-ray source (standards of cables and connectors, format of the synchronizing signal, etc.). To solve this problem, various automatic exposure control (AEC) methods have been disposed, whereby the start of x-ray radiation from the x-ray source may be detected on the side of the x-ray image detector so that the image detector may be synchronized with the x-ray source without the need for the synchronizing signal from the x-ray source.

For example, JPA 2005-143802 discloses utilizing parts of pixels of the x-ray image detector as detective pixels for detecting the end of x-ray radiation. Specifically, output values from these partial pixels are detected in the beginning of x-ray radiation, and from among these pixels, one outputting the highest value, representative of the largest amount of radiation, is selected as a reference pixel for judgment. Then the output of this reference pixel is monitored at regular intervals, to detect the end of x-ray radiation when the output level of the reference pixel stops increasing.

According to the above prior art method, however, since a large number of detective pixels are distributed over the whole imaging area of the image detector, it takes a certain time for selecting the reference pixel from among all of these detective pixels.

In addition, as a matter of fact, there may be variations in sensitivity between the detective pixels. If the sensitivity of the selected reference pixel is low, the end of radiation cannot be detected with sufficient accuracy. This may cause a problem especially when the radiography should be done at a reduced dosage level.

The same problem can occur if the start of radiation would be detected using such a reference pixel as above, although the mentioned prior art does not serve for detecting the start of radiation.

SUMMARY OF THE INVENTION

In view of the foregoing, the present invention has an object to provide a radiographic image detector that can quickly and precisely detect the start of radiation or the end of radiation toward its imaging area by itself, i.e. without any signals from external devices.

A radiographic image detector according to the present invention includes:

a plurality of detective elements arranged in an imaging area of an imaging device, the detective elements outputting electric signals corresponding to radioactive rays incident thereon;

a storage device previously storing sensitivity data on the detective elements for selecting at least a high-sensitivity element from among the detective elements;

a radiation detecting device for detecting at least one of the start of radiation and the end of radiation of radioactive rays toward the imaging area by monitoring the electric signal output from the high-sensitivity element selected on the basis of the sensitivity data; and a control device for controlling operation of the imaging device on the basis of results of detection by the radiation detecting device.

In the radiographic imaging device according to the present invention, the imaging area may preferably be divided into sections. The divided sections individually contain at least one of the detective elements, and at least a high-sensitivity element is selected in each of the sections.

The radiation detecting device may preferably judge an irradiated portion in the imaging area by monitoring electronic signals output from the high-sensitivity elements or the detective elements. In this embodiment, the radiation detecting device may detect the start or the end of radiation of the radioactive rays by monitoring electric signals output from those high-sensitivity elements which are located within the irradiated portion.

Preferably, the sections may be provided by dividing the imaging area into parallel elongated zones or squares.

The detective elements preferably have a structure substantially equal to that of pixels arranged in a matrix on the imaging area, except but the detective elements are always short-circuited to signal lines, which are provided for reading out electric signals from the pixels to detect an image of a subject from radioactive rays which are incident on the pixels after penetrating the subject. In this embodiment, the radiation detecting device may monitor the electric signals from the detective elements through the signal lines.

It is preferable to obtain the sensitivity data through a calibration and select the high-sensitivity element from the detective elements previously before the imaging device is actuated to image the subject.

More preferably, the high-sensitivity element may be selected on the basis of electric signals obtained from the detective elements during a gain calibration that is carried out for adjusting gains on the individual electric signals from the pixels and the detective elements in order to compensate for variations in sensitivity between the pixels and the detective elements.

In a preferred embodiment, more than one high-sensitivity element is selected from the detective elements, and the radiation detecting device concurrently compares the electric signals from the high-sensitivity elements with a predetermined threshold level, to detect a point of time as the start of radiation when any one of the electric signals from the high-sensitivity elements reaches or exceeds the threshold level.

The radiation detecting device may preferably detect the end of radiation by monitoring the electric signal of one high-sensitivity element, which has reached or exceeded the threshold level the earliest on detecting the start of radiation.

Another aspect of the present invention is a method of controlling a radiographic image detector, which includes an imaging device having an imaging area, in which pixels for generating electric signals corresponding to radioactive rays incident thereon are arrayed in a matrix and signal lines for reading out the electric signals from the pixels are provided, to detect an image of a subject from radioactive rays which are incident on the imaging area after penetrating the subject. The method of controlling the radiographic image detector includes the steps of:

selecting at least a high-sensitivity element from among a plurality of detective elements which are arranged in the imaging area to output electric signals corresponding to radioactive rays incident thereon;

detecting at least one of the start of radiation and the end of radiation of radioactive rays toward the imaging area by monitoring the electric signal output from the selected high-sensitivity element; and controlling operation of the imaging device on the basis of the detected start or end of radiation.

According to the present invention, at least the start of radiation or the end of radiation is detected by monitoring the output signal from the high-sensitivity element, which may be previously selected from among the detective elements before the actual imaging operation. Therefore, the radiographic image detector may detect the start of radiation or the end of radiation rapidly and precisely by itself.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIGS. 9A to 9F show bar graphs for explaining a method of selecting high-sensitivity elements from detective pixels in respective zones of the imaging area;

FIG. 12 is a flowchart illustrating an operation sequence of the radiographic image detector for detecting the irradiation field in free-position imaging.

DESCRIPTION OF THE PREFERRED EMBODIMENTS

First Embodiment

Figure 1:
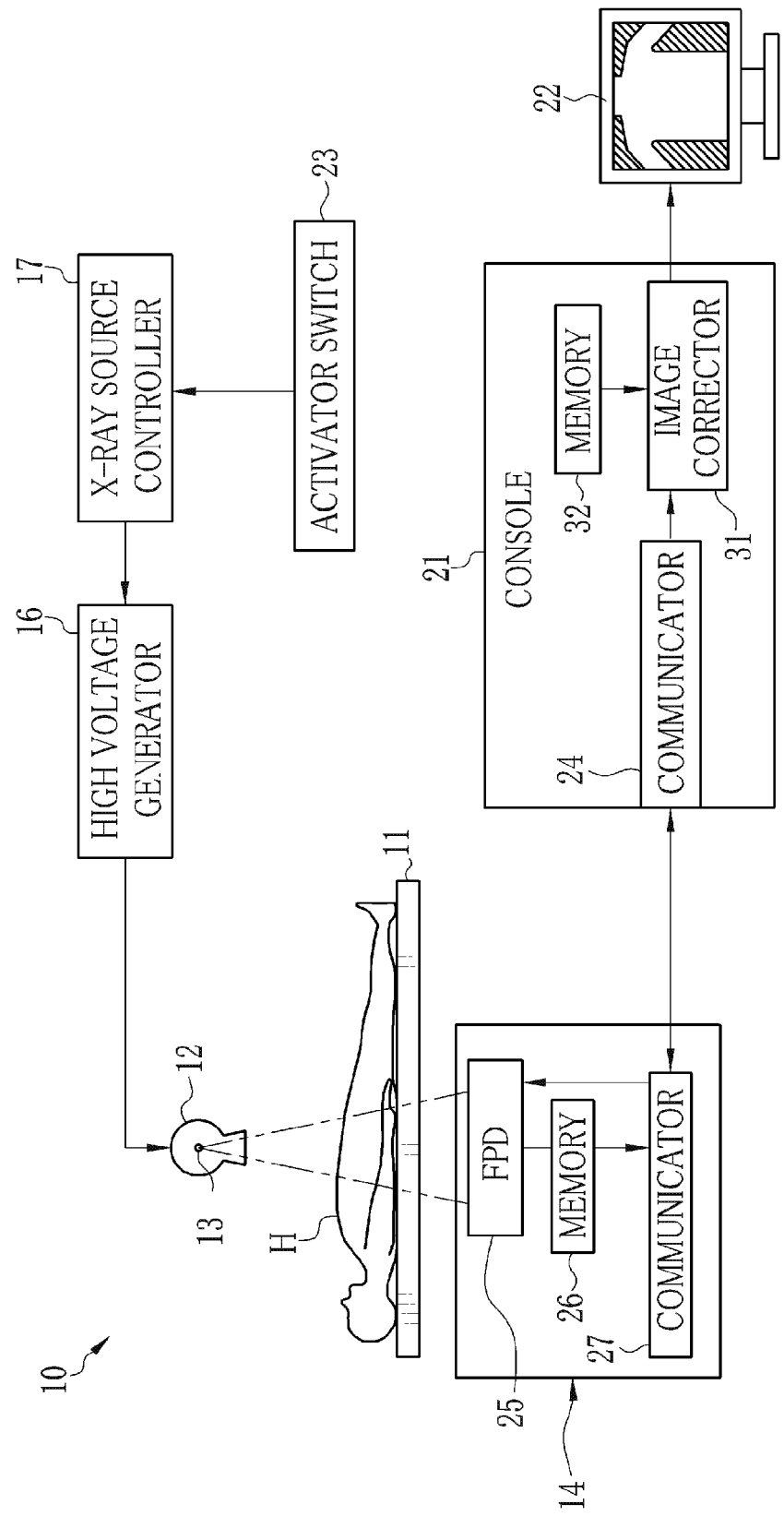
FIG. 1 is a schematic diagram illustrating a radiography system.

As shown in FIG. 1, an x-ray radiography system 10 includes a radiological examination table having a table top 11 for laying a test subject H thereon, an x-ray source 12 for projecting x-rays from an x-ray focus 13 toward the subject H, and a radiographic image detector 14 for detecting an x-ray image of the test subject H from x-rays that have penetrated through the test subject H. In this embodiment, the radiographic image detector 14 is formed as an electronic imaging cassette 14 that is removably attached to the radiological examination table. The x-ray source 12 consists of an x-ray tube and a collimator for limiting the radiation field of the x-rays from the x-ray tube.

The x-ray radiography system 10 also includes a high voltage generator 16, an x-ray source controller 17, a console 21, and a monitor 22.

The x-ray source controller 17 is provided with a not-shown operation panel, through which various image acquisition settings such as tube voltage, tube current and radiation time may be input into the controller 17. Also an activator switch 23 for inputting a radiation starting signal is connected to the x-ray source controller 17. The x-ray source controller 17 transfers the input radiation starting signal from the activator switch 23 to the high voltage generator 16 in combination with the input image acquisition settings.

The high voltage generator 16 generates a tube voltage and a tube current according to the image acquisition settings fed from the x-ray source controller 17, and applies the generated tube voltage and tube current to the x-ray source 12, causing the x-ray source 12 to start radiating x-rays.

The console 21 is a control device for controlling the electronic cassette 14. The console 21 sends a control signal to the electronic cassette 14 via a communicator 24, and receives data of the x-ray image detected by the electronic cassette 14. Note that the radiation starting signal from the activator switch 23 is not applied to the console 21. Therefore, the same image acquisition settings as those input in the x-ray source controller 17 should be input in the console 21, and the console 21 sends the image acquisition settings to the electronic cassette 14. The electronic cassette 14 detects the start and end of radiation from the x-ray source 12 by itself, as set forth in detail later.

The console 21 includes an image corrector 31 that processes the x-ray image data from the electronic cassette 14 for various kinds of image renderings, such as defect correction and noise reduction, and outputs the processed image data to the monitor 22. The defect correction is to correct pixel levels of defective pixels of the image data through interpolation. The noise reduction is to reduce dark current noises through subtraction of an offset image from the acquired x-ray image. The offset image is previously obtained from the electronic cassette 14 without being irradiated with x-rays, and stored in a memory 32. On the other hand, a gain correction or calibration is carried out in a signal processing circuit 53 of the electronic cassette 14, as will be described later.

The monitor 22 may display the x-ray image received by the console 21, and operational screens for operating the console 21 as well.

The electronic cassette 14 has a flat parallelepiped housing that contains a flat panel detector (FPD) 21 for detecting x-rays, a memory 26 for temporarily storing x-ray image data output from the FPD 25, and a communicator 27 for communicating the data in the memory 26 and the control signals with the console 21. The electronic cassette 14 may include not-shown batteries for supplying power to respective components of the electronic cassette 14, including the FPD 25. The communicator 27 may be a wireless communicator that uses electric waves or an optical signal such as infrared rays for wireless communication.

Figure 2:
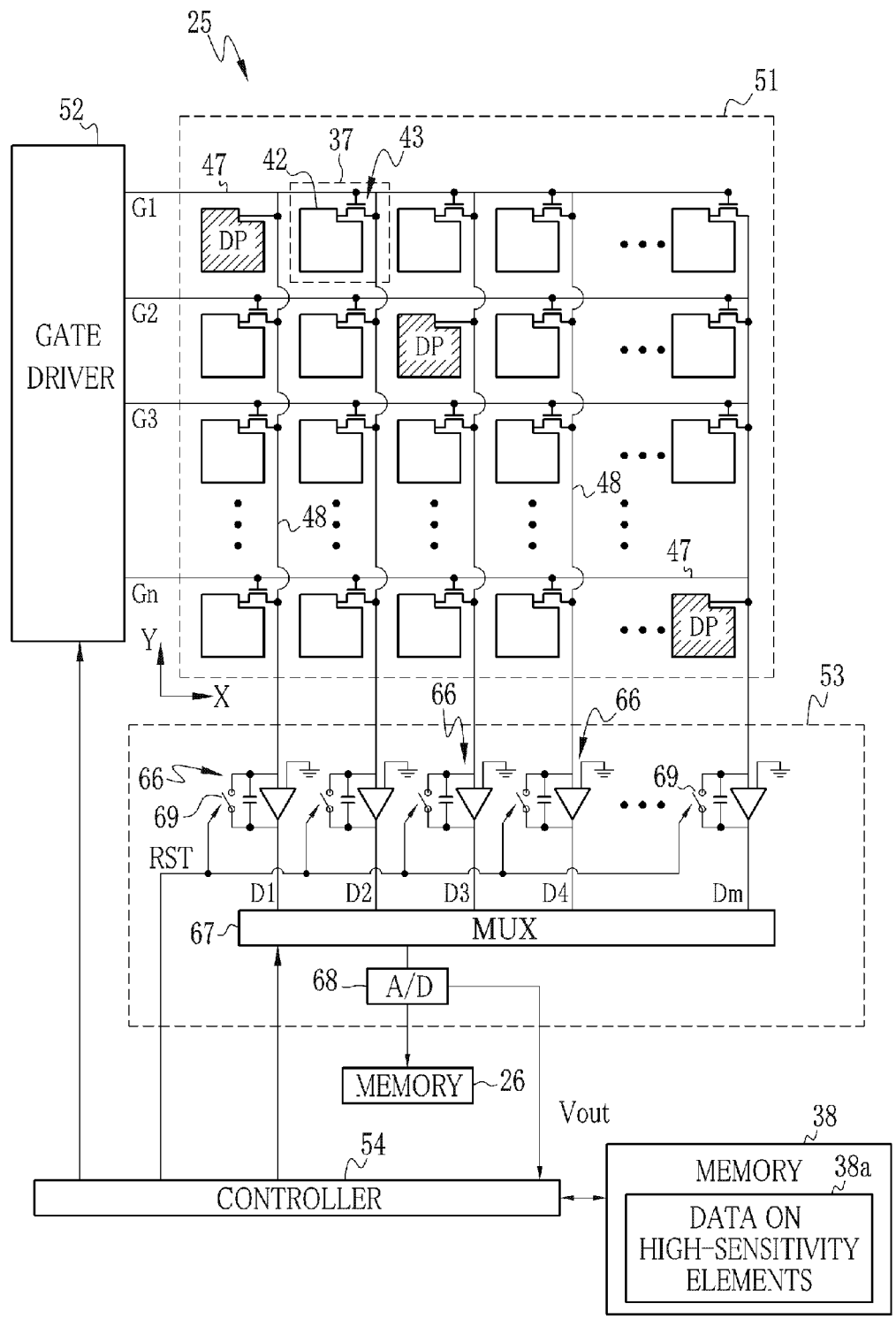
FIG. 2 is an explanatory diagram illustrating an electric structure of a flat panel radiographic image detector of the radiography system.

As shown in FIG. 2, the FPD 25 includes an imaging panel having an imaging area 51, a gate driver 52, the signal processing circuit 53 and a controller 54. In one embodiment, the imaging panel is constructed as a TFT active matrix substrate having a matrix of pixels (sensor elements) fabricated in an imaging area 51 thereon. The FPD 25 may be of an indirect conversion type that includes a not-shown scintillator for converting the incident x-rays to visible light, so that the pixels convert the visible light from the scintillator to electronic charges and accumulate the charges as electric signals corresponding to the incident amounts of x-rays. The scintillator is provided to face the entire imaging area 51.

Each pixel 37 consists of a photodiode 42, a not-shown capacitor for accumulating charges generated from the photodiode 42, and a thin film transistor (TFT) 43 as a switching element. The pixels 37 are arranged at predetermined intervals into a two-dimensional matrix of n columns (X-direction) and m rows (Y-direction), wherein n and m represent natural numbers.

The photodiode 42 has a layered structure consisting of a semiconductor layer and upper and lower electrodes provided respectively on top and bottom sides of the semiconductor layer. The semiconductor layer generates an electric charge (a pair of electron and hole) on incident visible light. The lower electrode is connected to the TFT 43, while the upper electrode is connected to a bias line and supplied with a bias voltage. The bias voltage causes the electron and hole to move from the semiconductor layer to the upper and lower electrodes, respectively. As a result, a signal charge is accumulated in the capacitor.

Scanning lines 47 and signal lines 48 are wired in a grid in the FPD 25 corresponding to the n rows and m columns of the pixels 37, respectively. The TFT 43 is connected at its gate to a scanning line 47, at its source to a signal line 48, and at its drain to the photodiode 42. The scanning lines 47 are connected to the gate driver 52, whereas the signal lines 48 are connected to the signal processing circuit 53.

The gate driver 52 inputs gate pulses G1 to Gn to respective scanning lines 47 according to control signals from the controller 54, switching the TFTs 43 to drive the FPD 25 in three operation modes for an accumulating operation, a reading operation and a resetting operation.

The accumulating operation is for accumulating the signal charges in the pixels 37, which is executed when the gate driver 52 turns off the TFTs 43 of the pixels 37. As a result, the capacitors of the pixels 37 are disconnected from the signal lines, so that the charges generated in the semiconductor layer are accumulated as the signal charges in the capacitors.

The reading operation is for reading the signal charges accumulated in the pixels 37 as a voltage signal through the signal lines 48. In the reading operation, the gate driver 52 outputs the gate pulses G1 to Gn sequentially to respective scanning lines 47, to turn on the TFTs 43 of one line after another. While the TFTs 43 are on, the accumulated signal charges are read out from the pixels 37 to the signal lines 48, and are fed through the signal lines 48 into the signal processing circuit 53. Thus, voltage signal representative of the signal charges is acquired.

The resetting operation is for sweeping dark charges off the pixels 37 by outputting the gate pulses G1 to Gn to the scanning lines 47 to turn on the TFTs 43. The dark charges are generated even while no x-ray is incident. So long as the TFT 43 is off, the dark charge is accumulated in the capacitors of the pixels 37 in the same way as the signal charge that corresponds to the incident x-ray. The dark charge will appear as a noise in the voltage signal if it is mixed with the signal charge. Therefore, the dark charges accumulated in the pixels 37 are swept off or drained through the signal lines 48 immediately before the accumulating operation in order to reduce the noise.

The signal processing circuit 53 includes integrating amplifiers 66, a multiplexer (MUX) 67, an A/D converter 68 and reset switches 69.

The integrating amplifiers 66 are connected to the signal lines 48 in one-to-one relationship. The integrating amplifier 66 consists of an operational amplifier and a capacitor connected between an input and an output of the operational amplifier. The signal line 48 is connected to the input of the operational amplifier. Another input of the operational amplifier is grounded. The integrating amplifiers 66 integrate the signal charges from respective signal lines 48, to convert the signal charges to voltage signals D1 to Dm. Outputs of the integrating amplifiers 66 are connected in parallel to each other to the multiplexer (MUX) 67. An output of the multiplexer 67 is connected to the A/D converter 68, and the A/D converter 68 is connected to the memory 26 and the controller 54. The reset switches 69 are individually connected to the integrating amplifiers 66. The reset switches 69 are turned on by a reset pulse RST from the controller 54, reset the charges to zero in the integrating amplifiers 66.

In the reading operation, the multiplexer 67 sequentially selects one from among the parallel-connected integrating amplifiers 66 after another, to feed voltage signals D1 to Dm from the integrating amplifiers 66 serially to the A/D converter 68. For instance, when the first gate pulse G1 is applied to the first scanning line 47, the TFTs 43 of the pixels 37 in the first row are turned on, so that the signal charges are read out from the pixels 37 of the first line through respective signal lines 48. Then, the multiplexer 67 reads out voltage signals D1 to Dm, corresponding to the signal charges accumulated in the first line of the pixels 37, sequentially from the integrating amplifiers 66 and serially transfers the voltage signals D1 to Dm to the A/D converter 68. The A/D converter 68 converts the voltage signals D1 to Dm of the first line to digital image data, which is stored in the memory 26.

When the voltage signals D1 to Dm of the first line have been readout from the integrating amplifiers 66, the controller 54 outputs the reset pulse RST to the integrating amplifiers 66, to turn on the reset switches 69 of the integrating amplifiers 66, clearing the signal charges of the first line off the integrating amplifiers 66. Thereafter, the controller 54 instructs the gate driver 52 to output the second gate pulse G2 to the second scanning line 47, to start reading signal charges from the pixels 37 in the second row. The signal processing circuit 53 converts the signal charges of the second line to digital image data and outputs the image data to the memory 26, in the same way as for the first line. When the signal charges have been read out from all pixels 37, image data of one frame is stored in the memory 26. The image data of one frame is read out from the memory 26 and output to the console 21 via the communicator 27. Thus an x-ray image of the subject H is detected.

The resetting operation may for example be executed in a line-sequential fashion, wherein the gate driver 52 outputs the gate pulses G1 to Gn sequentially to respective scanning lines 47 to turn on the TFTs 43 line by line, like in the reading operation. In the resetting operation, however, the controller 54 outputs the reset pulse RST synchronously with each of the gate pulses G1 to Gn from the gate driver 52, so that the dark charges discharged from the pixels 37 through the signal lines 48 into the integrating amplifiers 66 are reset by that reset pulse RST. Thus, any voltage signals D1 to Dm are not read out in the resetting operation.

The controller 54 controls the gate driver 52 and the signal processing circuit 53 to control the overall operation of the FPD 25. For example, the controller 54 controls the gate driver 52 to make the accumulating operation, the reading operation and the resetting operation, according to the control signals from the console 21. Moreover, the controller 54 controls the electronic cassette 14 to detect the start and end of radiation from the x-ray source 12, in order to control the timing of the operations of the FPD 25 according to the detected start and end of radiation.

For this purpose, specific pixels DP for detecting the start and end of radiation are provided besides the pixels 37 in the same imaging area 51 of the FPD 25. These specific pixels DP have an approximately uniform structure as other ordinary pixels 37, but the specific pixels DP are short-circuited to the signal lines 48, while the ordinary pixels 37 are connected through the TFTs 43 to the signal lines 48. The specific pixels DP may take up several percent of all pixels within the imaging area 51.

Electric charges generated from the specific pixels DP are served for detecting the start and end of radiation from the x-ray source 12. Therefore, the specific pixels DP will hereinafter be referred to as detective pixels DP. The detective pixels DP are distributed evenly over the whole imaging area 51, as set forth later with reference to FIG. 3.

As the detective pixels DP are connected to the signal lines 48 without interconnection of the TFTs 43, the electric charges generated in the detective pixels DP are immediately read into the signal lines 48, even during the accumulating operation while the TFTs 43 of the ordinary pixels 37 are off. Accordingly, the electric charges generated from the detective pixels DP will always flow into those integrating amplifiers 66 which are connected through the signal lines 48 to the detective pixels DP.

The controller 54 obtains a voltage signal Vout from the signal lines 48, to which the detective pixels DP are connected, and monitors a voltage signal Vout. Specifically, the controller 54 obtains the voltage signal Vout through the A/D converter 68 periodically at a sufficiently short interval enough for detecting the start and end of x-ray radiation.

Based on the obtained voltage signal Vout, the controller 54 detects the start and end of radiation, to control the operation of the FPD 25 at the timing according to the detected start and end of radiation. For example, the controller 54 controls the FPD 25 to repeat the resetting operation till the controller 54 detects the start of radiation, start the accumulating operation when the controller 54 detects the start of radiation, and stop the accumulating operation and start the reading operation when the controller 54 detect the end of radiation.

The controller 54 reads out the voltage signal Vout through selected ones of those signal lines 48 which are connected to the detective pixels DP. As will be described in detail later, the controller 54 selects such signal lines 48 that are connected to high-sensitivity elements SDP, which are previously selected as most sensitive ones from among the detective pixels DP, to read voltage signal Vout from each of the selected signal lines 48.

Figure 3:
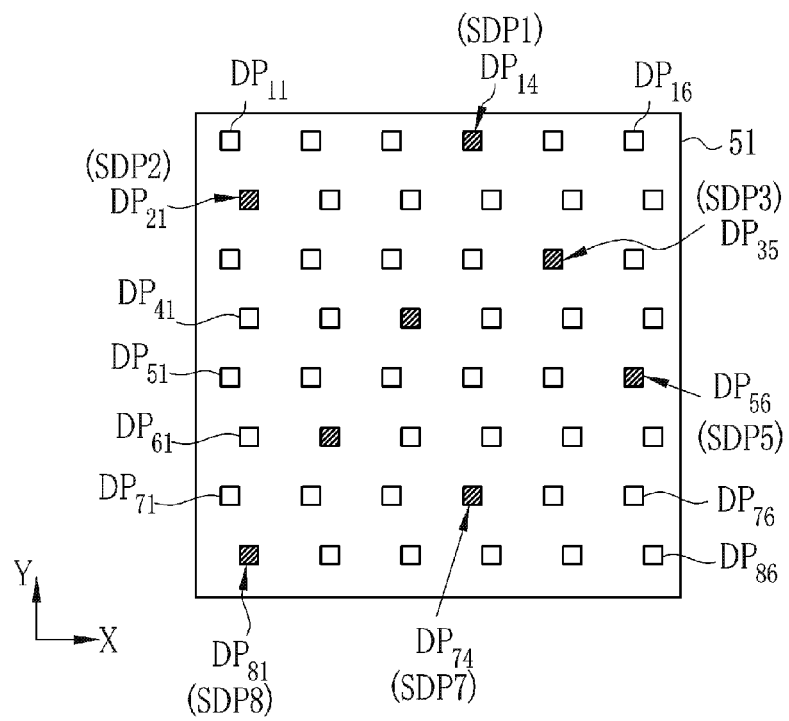
FIG. 3 is an explanatory diagram illustrating an example of arrangement of detective pixels including high-sensitivity elements.

As shown in FIG. 3, the detective pixels DP are distributed evenly over the whole imaging area 51. Locations of the detective pixels DP may be predetermined when the FPD 25 is designed or fabricated, and respective locations of all detective pixels DP are previously stored in a non-volatile memory 38 (see FIG. 2). The following embodiments will be described on the assumption that there are 48 detective pixels DP arranged in eight rows and six columns (DPij: i=1 to 8, j=1 to 6) within the imaging area 51. In general, however, there may be about four million of pixels in the imaging area 51. Since the detective pixels DP are determined to take up several percent of all pixels, there are much more than 48 detective pixels DP in the imaging area 51. Also for the brevity sake, the detective pixels DP are assumed to be connected to the signal lines 48 in one-to-one relationship in the following description.

Moreover, the FPD 25 is assumed to select eight elements as the high-sensitivity elements SDP (SDP1 to SDP8) among the signal lines 48 detective pixels DP, and store respective locations. As shown in FIG. 3, the high-sensitivity elements SDP are also distributed substantially evenly among all detective pixels DP.

The high-sensitivity elements SDP are selected during gain calibration that is carried out for deciding individual gains of the integrating amplifiers 66 applied for converting the signal charges to voltage signal in the reading operation. For example, the gain calibration includes measuring respective sensitivities of the pixels 37 from image data obtained from the FPD 25 while irradiating the FPD 25 with a predetermined dose of x-rays without any subject H between an x-ray source and the FPD 25, to decide the gains of the integrating amplifiers 66 according to the sensitivities of the pixels 37.

Figure 4:
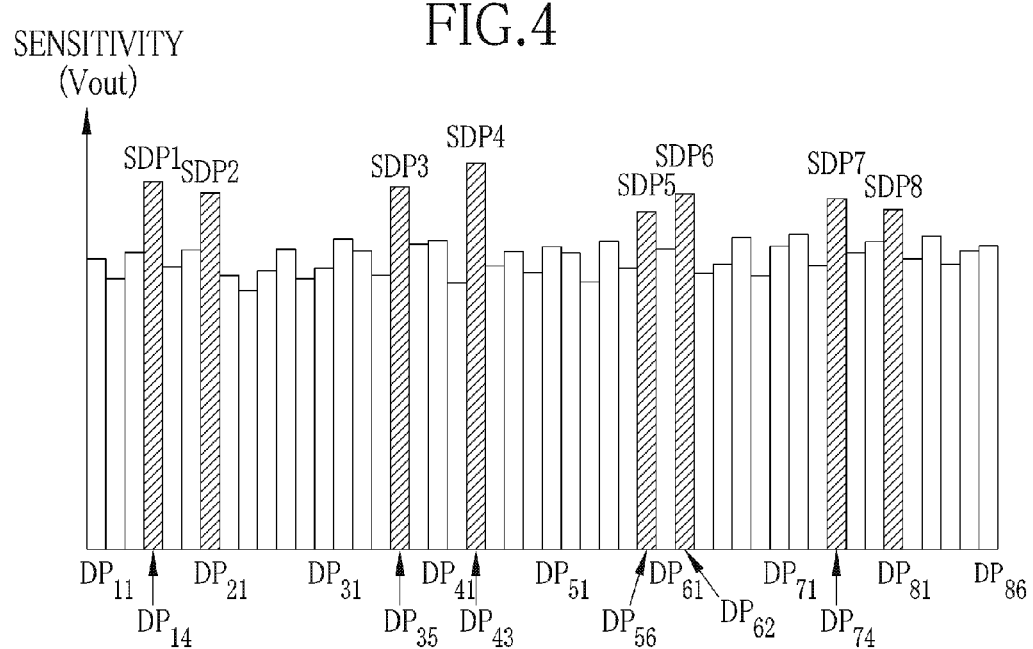
FIG. 4 is a bar graph for explaining a method of selecting high-sensitivity elements from among the detective pixels.

Before adjusting the gains of the integrating amplifiers 66 to the decided values in the gain calibration, the controller 54 obtains voltage signal Vout on each of those signal lines 48 which are connected to the detective pixels DP while setting the gain of the corresponding integrating amplifiers 66 at a constant value. Because being obtained at the same gain, respective voltage signals Vout represent the sensitivities of the related detective pixels DP. Therefore, the controller 54 may select from among the detective pixels DP a predetermined number of high-sensitivity elements SDP in the order from highest sensitivity indicated by the highest voltage levels of respective voltage signals Vout. In the example shown in FIG. 4, eight detective pixels DP ($DP_{14}$, $DP_{21}$, $DP_{35}$, $DP_{43}$, $DP_{56}$, $DP_{62}$, $DP_{74}$, $DP_{81}$) are selected as the high-sensitivity elements SDP. However, the number of high-sensitivity elements SDP is not limitative, but may be determined appropriately. The controller 54 writes data 38a about respective locations of the selected high-sensitivity elements SDP1 to SDP8 and the signal lines 48 being connected to these high-sensitivity elements SDP1 to SDP8 in the memory 38 (see FIG. 2). Thus the controller 54 may select the signal lines 48 connected to the high-sensitivity elements SDP with reference to the data 38a stored in the memory 38.

When acquiring an x-ray image in the radiographic system 10 configured as above, the electronic cassette 14 (FPD 25) detects the start and end of x-ray radiation with reference to output levels of the high-sensitivity elements SDP, and makes the accumulating operation, the reading operation and the resetting operation at the timings determined by the detected start and stop of x-ray radiation.

Figure 5:
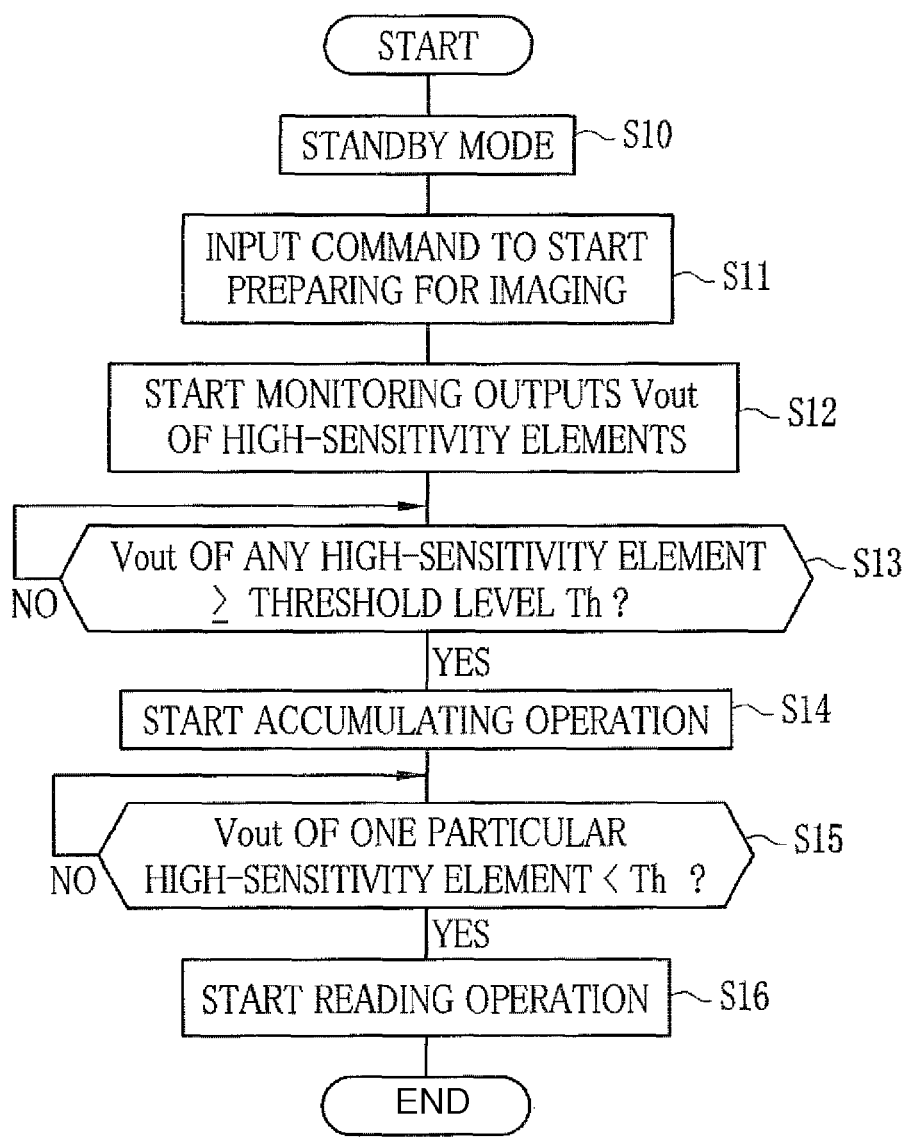
FIG. 5 is a flowchart illustrating an operation sequence of the radiographic image detector according to a first embodiment.

Referring to FIG. 5, the operation of the electronic cassette 14 will be described. When the electronic cassette 14 is powered on, the electronic cassette 14 is initially set in a standby mode (step S10), wherein the FPD 25 repeats the resetting operation to sweep out the dark charges from the pixels 37 to make ready for an image acquisition.

Then, image acquisition settings are input to the x-ray source controller 17 and the console 21. The image acquisition settings include tube voltage for determining energy spectrum of the x-rays from the x-ray source 12, tube current for determining radiation dose per unit time, and radiation time for radiating the x-rays. The image acquisition settings vary depending on the target site to be imaged, the age of the subject H, and other factors. Data of the input image acquisition settings is transferred from the console 21 to the electronic cassette 14, and the controller 54 receives the image acquisition setting data as a command to start preparing for imaging (S11).

On receipt of the start command, the controller 54 begins to monitor voltage signals Vout on the selected signal lines 48 that are connected to the high-sensitivity elements SDP1 to SDP8, hereinafter these voltage signals will be referred to as voltage signals of the high-sensitivity elements (S12). Meanwhile, the FPD 25 continues repeating the resetting operation.

Specifically, the controller 54 monitor respective voltage signals of the high-sensitivity elements SDP1 to SDP8 by comparing these voltage signals with a predetermined threshold level Th periodically at predetermined intervals (S13). As the controller 54 inputs the reset pulse RST to the integrating amplifiers 66 at the predetermined intervals, the voltage signals Vout of the high-sensitivity elements SDP will also be reset to zero at each input of the reset pulse RST, so that the voltage signals Vout represent the signal charges generated from the high-sensitivity elements SDP during the interval between the reset pulses RST.

So long as respective voltage signals Vout of the high-sensitivity elements SDP1 to SDP8 are less than the threshold level Th, the controller 54 continues repeating the resetting operation and monitoring voltage signals Vout of the high-sensitivity elements SDP1 to SDP8.

When any of voltage signals Vout of the high-sensitivity elements SDP1 to SDP8 gets equal to or exceeds the threshold level Th, the controller 54 detects it as a start of x-ray radiation. Specifically, as shown for example in FIG. 6, providing that the x-ray source 12 starts radiating x-rays at a time point Ta and the x-rays get to a predetermined intensity at a time point Tb, respective voltage signals Vout of the high-sensitivity elements SDP1 to SDP8 begin to increase from the radiation start time Ta. However, because of variations in sensitivity and differences in positional relation to the subject H between the high-sensitivity elements SDP1 to SDP8, voltage signals Vout of the high-sensitivity elements SDP1 to SDP8 may have different levels and curves along time from each other. For instance, if one high-sensitivity element SDP is located under a scarcely radiolucent site, such as a bony site, the intensity of x-rays incident on this element is low, so that the voltage signal Vout of this high-sensitivity element SDP will remain in a low level. For this reason, the controller 54 detects the start of radiation by monitoring voltage signal Vout of one high-sensitivity element SDP that has reached or exceeded the threshold level Th at first among all voltage signals Vout of the selected high-sensitivity elements SDP1 to SDP8.

Figure 6:
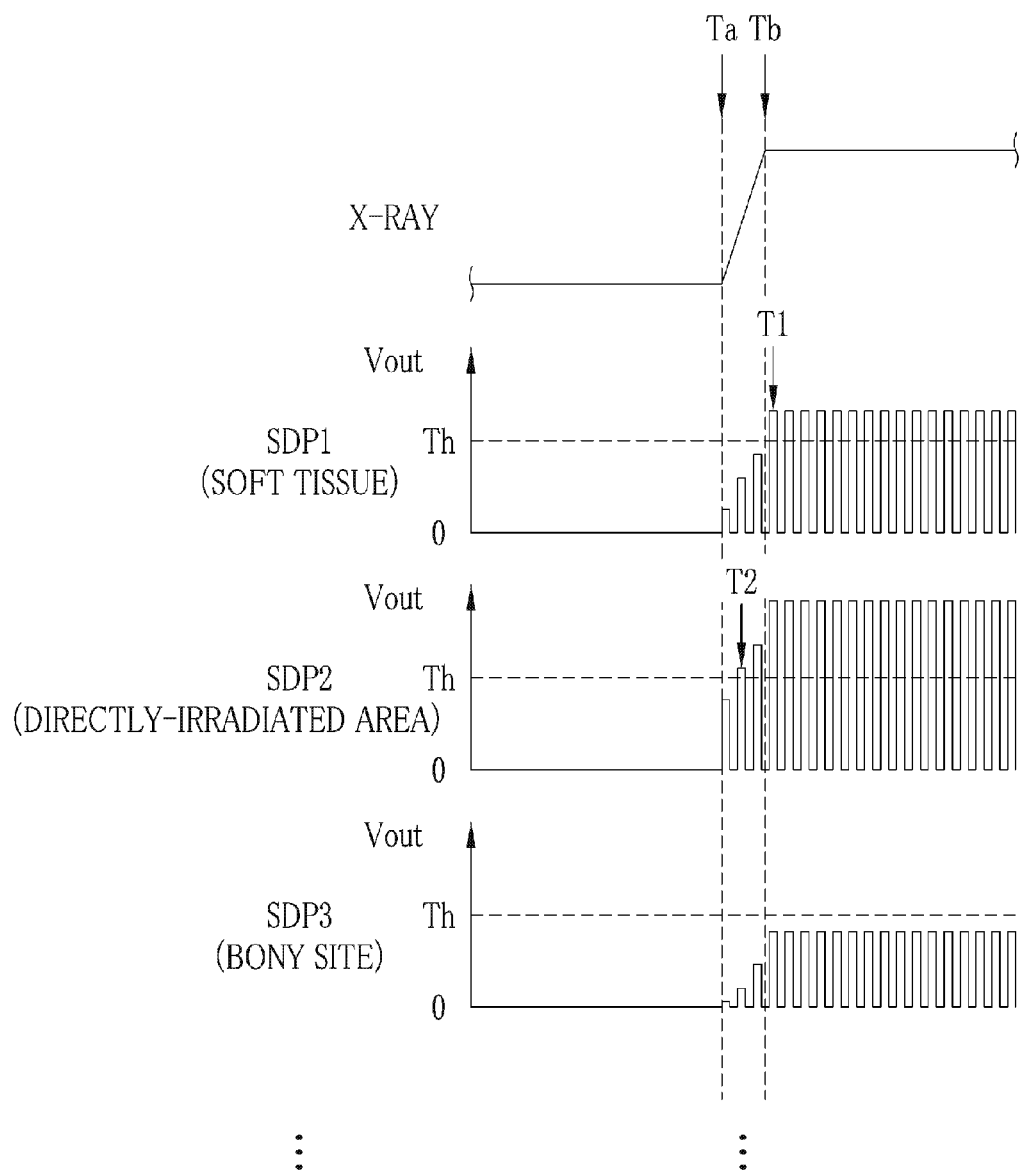
FIG. 6 shows timing charts illustrating how the start of x-ray radiation is detected by monitoring voltage signals from the high-sensitivity elements.

In the example shown in FIG. 6, the high-sensitivity element SDP1 is under a relatively radiolucent soft tissue of the subject H, the high-sensitivity element SDP2 is in a directly irradiated area on which x-rays from the x-ray source 12 are directly incident without penetrating the subject H, and the high-sensitivity element SDP3 is under a bony part of the subject H. In this case, voltage signals Vout of all high-sensitivity elements start increasing at the time Ta, and voltage signal Vout of the high-sensitivity element SDP1 under the soft tissue exceeds the threshold level Th at a time point T1 that is after the time Tb. On the other hand, voltage signal Vout of the high-sensitivity element SDP2 in the directly irradiated area exceeds the threshold level That a time point T2 that is before the time Tb, i.e. before the x-rays reach the set intensity, because the intensity of x-rays on the directly irradiated area is higher than other areas where the x-rays after penetrating the subject H are incident. To contrast, since the incident amount of x-rays on the high-sensitivity element SDP3 is low as the high-sensitivity element SDP3 is under the born, voltage signal Vout of the high-sensitivity element SDP3 does not reach the threshold level Th even after the time Tb.

Leaving other high-sensitivity elements SDP4 to SDP8 out of consideration, here for the brevity sake, the controller 54 detects a start of radiation at the time T2 when it determines that voltage signal Vout of the high-sensitivity element SDP2 gets to or exceeds the threshold level Th.

Upon detecting the start of radiation, the controller 54 stops the gate driver 52 from outputting the gate pulses G1 to Gn, so that the TFTs 43 of all pixels 37 are turned off, starting the accumulating operation (S14).

As the accumulating operation starts, the pixels 37 begin to accumulate signal charges for imaging. On the other hand, signal charges generated in the high-sensitivity elements SDP1 to SDP8, as being short-circuited to the signal lines 48, flow to the signal lines 48 as soon as they are generated. The controller 54 continues monitoring voltage signals Vout of the high-sensitivity elements SDP through the signal processing circuit 53 in order to detect the end of radiation during the accumulating operation (S15). Also during the accumulating operation, the controller 54 inputs the reset pulse RST to the integrating amplifiers 66 at the predetermined intervals while monitoring voltage signals Vout.

Figure 7:
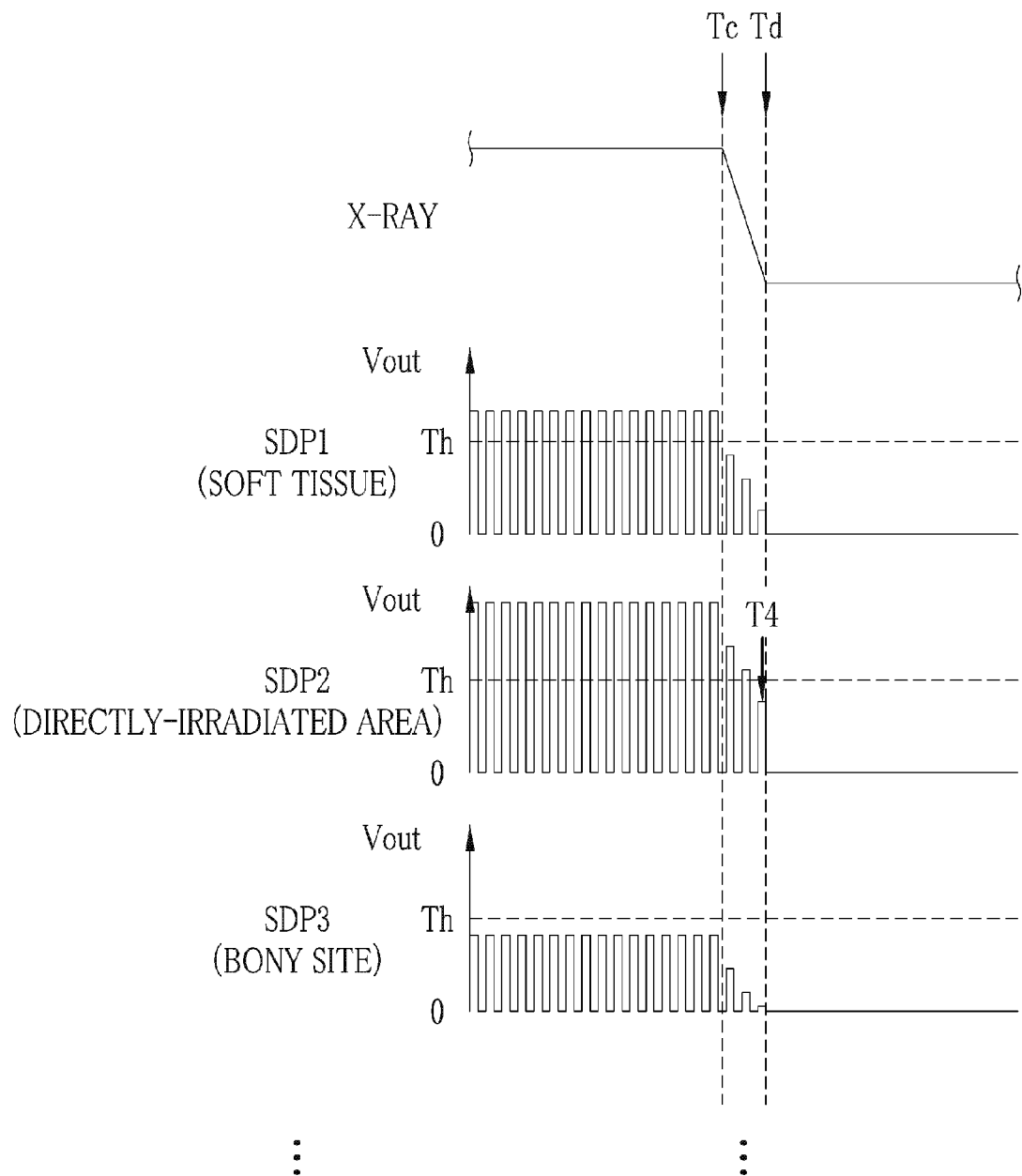
FIG. 7 shows timing charts illustrating how the end of x-ray radiation is detected by monitoring a voltage signal from a high-sensitivity element.

Referring to an example of FIG. 7, wherein the intensity of x-rays starts decreasing at a time point Tc, and the radiation completely stops at a time point Td, voltage signals Vout of the high-sensitivity elements SDP1 to SDP8 begin to decrease from the time Tc, and gets down to zero at the same time Td as the complete stop of radiation. However, like in the beginning of radiation, voltage signals Vout of the high-sensitivity elements SDP1 to SDP8 may have different levels and time curves from each other depending on their locations to the subject H and individual sensitivities. For this reason, the controller 54 detects the end of radiation by monitoring voltage signal Vout of one of the high-sensitivity elements SDP1 to SDP8, of which the voltage signal Vout has reached or exceeded the threshold level Th at the earliest point of time in the beginning of radiation. Accordingly, in the present example, so long as the voltage signal Vout of the high-sensitivity element SDP2 is not less than the threshold level Th, the controller 54 controls the FPD 25 to continue the accumulating operation. At a time point T4 when the controller 54 determines that voltage signal Vout of the high-sensitivity element SDP2 gets less than the threshold level Th, the controller 54 detects it as the end of radiation.

Then the controller 54 terminates the accumulating operation at the end-of-radiation detection time T4, and actuates the gate driver 52 to output the gate pulses G1 to Gn sequentially to respective scanning lines 47 to make the reading operation (S16).

Image data acquired through each reading operation is temporarily stored in the memory 26 and then transmitted to the console 21. Since the image data contains such image pixels that correspond to the detective pixels DP and are defective, the image data is rendered with the above-mentioned defect correction in the image corrector 31. In addition, the image corrector 31 processes the image data for other various image-renderings such as noise reduction to produce data of a visible x-ray image that may be displayed on the monitor 22 or transmitted to a not-shown image server for storage.

As described so far, according to the present invention, the FPD 25 of the electronic cassette 14 detects the start and end of radiation by monitoring voltage signals Vout of only those elements SDP having highest sensitivities, which are preselected from among the detective pixels DP. Thus, the electronic cassette 14 can detect the start and end of radiation more rapidly than by monitoring voltage signals Vout of all detective pixels DP. Moreover, the start and stop of radiation may be more accurately detected based on voltage signals Vout of the high-sensitivity elements SDP than when it is based on voltage signals Vout of those detective pixels DP having lower sensitivities or those with lower doses due to their positions to the subject H.

Since the high-sensitivity elements SDP are preselected from among the detective pixels DP and used for detecting the start and stop of radiation, it becomes possible to detect the start and stop of radiation even while the total dose of radiation is relatively low. Furthermore, using the high-sensitivity elements SDP will lead to acquiring images with improved S/N ratios and reduced influence of noises such as dark charge noise.

Indeed the electronic cassette 14 detects the start of radiation by monitoring voltage signals Vout of all the high-sensitivity elements SDP, there is no such complicated steps as conventional mutual comparison of individual voltage signals Vout. The electronic cassette 14 detects the start of radiation at the time when voltage signal Vout of any of the high-sensitivity elements SDP exceeds the threshold level Th. Therefore, the electronic cassette 14 can detect the start of radiation immediately after the actual start of radiation from the x-ray source 12. Since the start of radiation is detected with little time lag from the actual start of radiation, the x-rays radiated toward the subject H may be made effective use for imaging.

Moreover, the electronic cassette 14 can detect the end of radiation quickly and precisely, because the end of radiation is detected by monitoring the voltage signal Vout of the same high-sensitivity element SDP, based on which the start of radiation was detected, i.e. which has exceeded the threshold level Th at the earliest point of time. Furthermore, the x-rays irradiating the subject H in a period from Tc to Td may be made effective use of for imaging.

In the above-described first embodiment, the detective pixels DP (and the high-sensitivity elements SDP) are distributed evenly over the whole imaging area 51. However, this configuration is not limitative. Since central portion of the imaging area 51 of the electronic cassette 14 is most frequently used for imaging the subject H, the detective pixels DP may not be provided in the entire imaging area 51 but may be provided in and around the central portion of the imaging area 51. Alternatively, the detective pixels DP may be provided unevenly in the entire imaging area 51 such that the density of the detective pixels DP is higher in the central portion of the imaging area 51, as being more frequently used for imaging.

Second Embodiment

In the above first embodiment, the high-sensitivity elements SDP are selected in the order from highest sensitivity among the detective pixels DP which are evenly distributed over the whole imaging area 51. But this configuration is not limitative. For example, as will be described as a second embodiment, the imaging area 51 may be divided into sections, so that the high-sensitivity elements SDP may be selected in respective sections.

Figure 8:
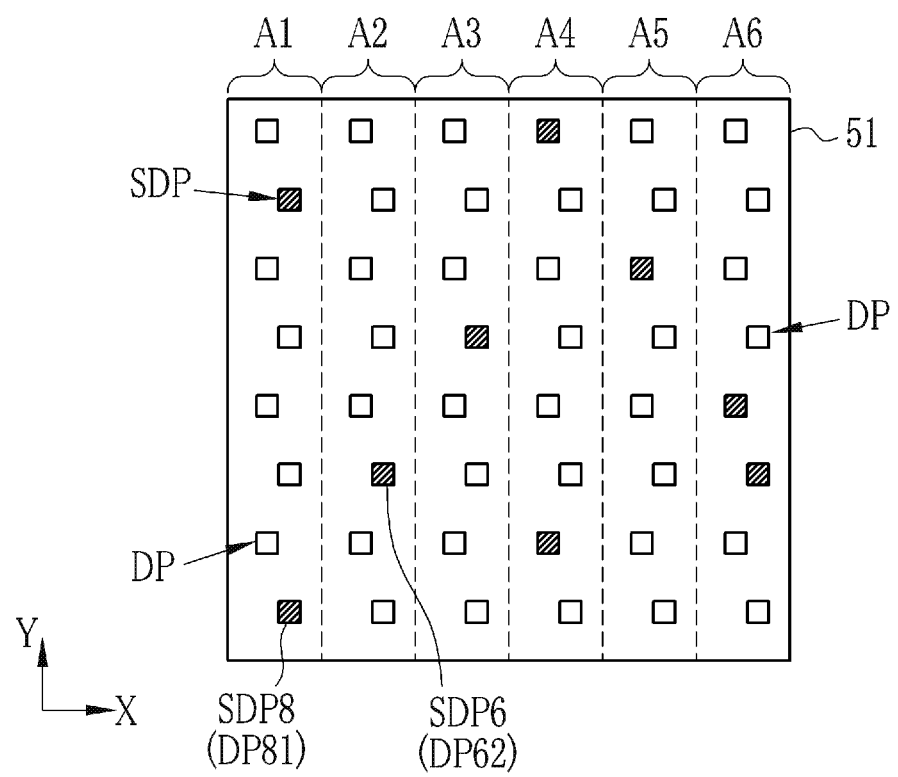
FIG. 8 is an explanatory diagram illustrating an embodiment, wherein an imaging area is divided into parallel zones to select high-sensitivity elements in respective zones.

In an example of FIG. 8, the imaging area 51 is divided into parallel zones A1 to A6, extending in the Y-direction along the signal lines 48, and the high-sensitivity elements SDP are selected from the detective pixels DP, at least one for each of these zones A1 to A6. The reason why the imaging area 51 is divided into the zones A1 to A6 elongated in the direction of the signal lines 48 is because more than one detective pixel DP may be connected to one signal line 48 but the locations of the detective pixels DP in the Y direction cannot be determined by voltage signals Vout obtained from the detective pixels DP connected to the same signal line 48.

In the second embodiment, the high-sensitivity elements SDP may be selected in the same way as described with respect to the first embodiment. That is, the high-sensitivity elements SDP may be selected through comparison between respective voltage signals Vout of the detective pixels DP, which are obtained during the gain calibration. According to the second embodiment, however, voltage signals Vout (or sensitivities) of the detective pixels DP are compared with each other within the individual zones A1 to A6, as shown in FIGS. 9A to 9D, while the comparison of the voltage signals Vout is made between all detective pixels DP across the entire imaging area 51 in the above first embodiment. Thus, at least one of the detective pixels DP is selected as the high-sensitivity element SDP in each of the zones A1 to A6.

In the case where the imaging area 51 is not divided into sections and the high-sensitivity elements SDP are selected from all the detective pixels DP regardless of their locations, the selected high-sensitivity elements SDP may be unexpectedly gathered in a portion of the imaging area 51, for example in a corner of the imaging area 51. Selecting the high-sensitivity elements SDP in respective zones A1 to A6 of the imaging area 51 is effective to distribute the high-sensitivity elements SDP over the whole imaging area 51.

As shown in FIGS. 8 and 9, wherein two high-sensitivity elements SDP are selected in each of the zone A1 (FIG. 9A) and the zone A4 (FIG. 9D), whereas only one high-sensitivity element SDP is selected in each of the other zones A2, A3, A5 and A6 (Figs. B, C, E, F), the number of high-sensitivity elements SDP being selected in the individual zones A1 to A6 may be determined for each zone, but at least one high-sensitivity element SDP for each zone. For example, a greater number of high-sensitivity elements SDP may be selected in each of those zones A3 and A4 which include the central portion of the imaging area 51, as being more frequently used, than the number of high-sensitivity elements SDP selected in each of other zones A1, A2, A5 and A6.

In the embodiment illustrated in FIGS. 8 and 9, the imaging area 51 is divided into the elongated rectangular zones A1 to A6 for selecting the high-sensitivity elements SDP in each of the zones A1 to A6, the imaging area 51 may be divided in other formats. For example, the imaging area 51 may be divided into more than or less than six sections for selecting the high-sensitivity elements SDP in each section.

Figure 10:
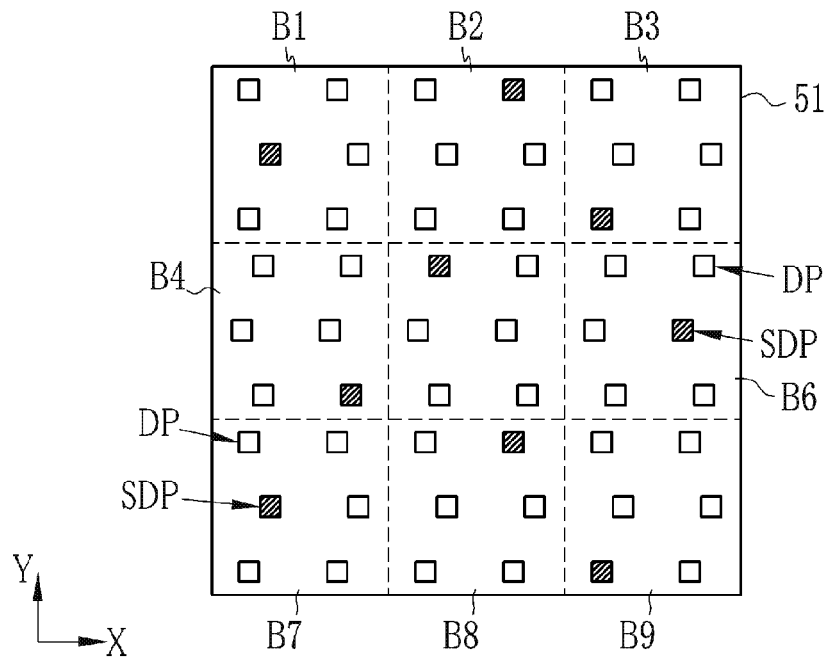
FIG. 10 is an explanatory diagram illustrating a variation, wherein an imaging area is divided into squares to select high-sensitivity elements in respective squares.

Moreover, as shown in FIG. 10, the imaging area 51 may be divided in both vertical and horizontal directions into squares B1 to B9 for selecting the high-sensitivity elements SDP in respective squares B1 to B9. This embodiment is particularly suitable for a CMOS type flat panel detector, because it permits individual access to each pixel for reading the signal charge as well as to each detective pixel for detecting the start and end of radiation. In order to apply this configuration to a TFT type flat panel detector, like the above FPD 25, individual signal lines for the detective pixels DP should be provided in the FPD.

Third Embodiment

When the electronic cassette 14 is used for free-position imaging, i.e. no mounted in a radiographic table or stand, the imaging area 51 may be only partly irradiated with x-rays during the imaging. According to a third embodiment, the electronic cassette 14 is configured to determine an irradiated portion of the imaging area 51, an irradiation field of x-rays, in free-position imaging.

Figure 11:
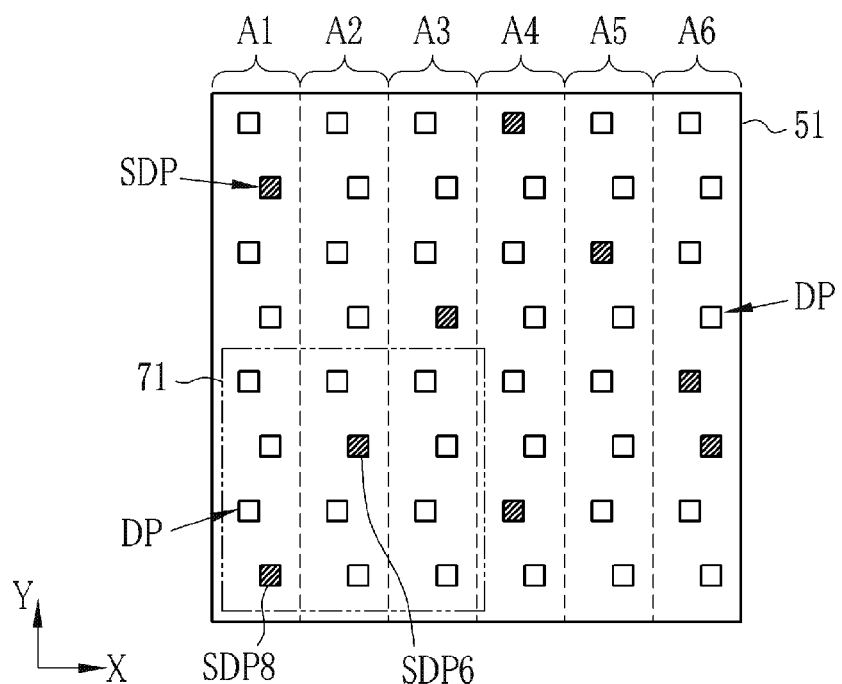
FIG. 11 is an explanatory diagram illustrating an embodiment, wherein an x-ray irradiation field is limited to a portion of the imaging area in free-position imaging.

As shown in FIG. 11, the imaging area 51 is assumed to be divided into parallel zones A1 to A6 for selecting the high-sensitivity elements SDP in respective zones A1 to A6, like in the second embodiment. In this example, the electronic cassette 14 is positioned such that the irradiation field 71 is located in a lower left portion of the imaging area 51.

Referring to FIG. 12, the operation sequence of the electronic cassette 14 according to the third embodiment will be described. Upon being powered on, the electronic cassette 14 starts operating in the standby mode (step S20), and thereafter when the console 21 receives the image acquisition settings, a command to start preparing for imaging is applied to the controller 54 (S21). Upon receipt of the command to start preparing for imaging, the controller 54 starts monitoring voltage signals Vout of the high-sensitivity elements SDP (S22).

Thereafter when the electronic cassette 14 is irradiated with x-rays from the x-ray source 12, the controller 54 determines the irradiation field 71 (S23). The irradiation field 71 is determined by monitoring voltage signals Vout of the high-sensitivity elements SDP. Specifically, voltage signals Vout of the high-sensitivity elements SDP are compared with a second threshold level, which is predetermined for the determination of the irradiation field and is lower than the threshold level Th used for the detection of the start of radiation. The controller 54 determines a portion of the imaging area 51 to be the irradiation field 71, which covers all of those high-sensitivity elements SDP outputting such voltage signals Vout that are equal to or more than the second threshold level. Note that the second threshold level should be set as low as possible insofar as it allows discriminating noises, which will be overlaid on voltage signals Vout due to dark charges, from the voltage signals Vout representative of the amounts of irradiation.

The controller 54 monitors voltage signals Vout of only those high-sensitivity elements SDP which are located in the irradiation field 71, to detect the start of radiation depending on whether the monitored voltage signals Vout from the irradiation field 71 get to or exceed the threshold level Th (S24). Since the range of high-sensitivity elements SDP to be monitored for detecting the start of radiation is limited within the irradiation field 71, the start of radiation can be more quickly detected in comparison with the case where voltage signals Vout of all high-sensitivity elements SDP should be monitored. Thus, the start of radiation may be detected at about the same time as the determination of the irradiation field 71.

For instance, while voltage signals Vout of eight high-sensitivity elements SDP 1 to SDP8 are monitored to detect the start of radiation in the first embodiment, there are merely two high-sensitivity elements in the irradiation field 71, the high-sensitivity element SDP 8 in the zone A1 and the high-sensitivity elements SDP 6 in the zone A2, in the example of FIG. 11. Therefore, according to the third embodiment, the controller 54 may have to compare voltage signals Vout of only two high-sensitivity elements SDP6 and SDP8 with the threshold level Th. Thus, load of processing on the controller 54 will be reduced to ¼ as compared to the first embodiment, reducing the probability of delay in detecting the start of radiation.

Upon detecting the start of radiation, the controller 54 makes the FPD 25 proceed to the accumulating operation (S25). Thereafter when the voltage signal Vout of the high-sensitivity element SDP that was accounted for the start of radiation gets less than the threshold level Th, the controller 54 detects it as the end of radiation (S26), and starts the reading operation (S27).

As described so far, according to the third embodiment, the electronic cassette 14 determines the irradiation field 71 in free-position imaging, and limits the range of high-sensitivity elements SDP to be served for detecting the start of radiation within the irradiation field 71. Therefore, even in a case where the irradiation field 71 is unknown before the start of radiation for free-position imaging, it is possible to detect the start and end of radiation quickly and precisely.

The method of detecting the start of radiation according to the third embodiment may also be applicable to such a FPD as described in the first embodiment, wherein the high-sensitivity elements SDP are selected regardless of their locations in the imaging area 51, but the method according the third embodiment is more preferably applicable to such a FPD as described in the second embodiment, wherein the high-sensitivity elements SDP are selected in each section of the imaging area 51 so that the high-sensitivity elements SDP are distributed more evenly over the whole imaging area 51.

Although the irradiation field 71 is determined by monitoring voltage signals Vout of the high-sensitivity elements SDP in the third embodiment, other detective pixels DP than those selected as high-sensitivity elements SDP may be served for determining the irradiation field 71. Alternatively, both the high-sensitivity elements SDP and other detective pixels DP may be used for this purpose.

The above first to third embodiments have been described on the assumption that the detective pixels DP are connected to the signal lines 48 in one-to-one relationship. However a plurality of detective pixels DP may be connected to one signal line 48. If, for example, two detective pixels DP are connected to one signal line 48, voltage signal Vout obtained through this signal line 48 represents the total level of signal charges from these two detective pixels DP. Therefore, the controller 54 obtains the voltage signal Vout at substantially doubled levels, which is equivalent to doubled sensitivity of the detective pixels DP. Therefore, the two detective pixels DP connected to one signal line 48 will be selected as high-sensitivity elements SDP.

While the electronic cassette 14 detects both the start and end of radiation in the above first to third embodiments, the electronic cassette may merely detect either the start of radiation or the end of radiation. For example, it is possible to detect only the start of radiation but not the end of radiation. In that case, when the start of radiation is detected, the electronic cassette starts the accumulating operation and also starts counting time from the start of radiation. When the radiation time given as one of the image acquisition settings is over, the accumulating operation is terminated.

Although the detective pixels DP are connected directly to the signal lines 48 without the TFTs 43 being interconnected in the above first to third embodiments, the detective pixels DP may have another structure. For example, in a CMOS type FPD, the ordinary pixels for imaging may serve as the detective pixels DP, because the CMOS type FPD allows reading signal charges discriminated from each other from individual CMOS type pixels without reducing the amounts of signal charges accumulated in the pixels, i.e. in a non-destructive fashion. Moreover, the detective pixels DP may be connected to respective signal lines specific for the detective pixels DP separately from the signal lines 48 for the ordinary pixels 37 for imaging. Then, the detective pixels DP need not to be short-circuited, but may be connected to the signal lines specific for the detective pixels DP through TFTs or the like, while the pixels 37 for imaging and the detective pixels DP are connected to common signal lines 48 of the FPD 25 in the first to the third embodiments.

In the above embodiments, the selection of the high-sensitivity elements SDP from among the detective pixels DP is made during the gain calibration that may generally be carried out as a process of regular maintenance. Alternatively, it is possible to select the high-sensitivity elements SDP from among the detective pixels DP during an examination of the electronic cassettes 14 for shipment. Because the sensitivity of high-sensitivity elements SDP may decline with time, it is preferable to reselect the high-sensitivity elements SDP and update the data on the high-sensitivity elements SDP during the gain calibration in the regular maintenance.

In the above embodiments, voltage signals Vout of the high-sensitivity elements SDP are compared with the threshold level Th to detect the start and end of radiation. However, the present invention is not limited to this method. For example, the start and end of radiation may be detected by monitoring the changing rate (or the gradient of time curve) of each voltage signal Vout of the high-sensitivity element SDP. Specifically, referring to FIGS. 6 and 7, because the changing rate of the voltage signal Vout increases from zero to a predetermined level when the radiation from the x-ray source starts at the time Ta, this point of time Ta may be detected as the start of radiation (see FIG. 6). The changing rate of the voltage signal Vout decreases to a lower level at the time point Tb, and thereafter increases again from the time point Tc (see FIG. 7). Thereafter, as the radiation completely stops at the time point Td, the changing rate of the voltage signal Vout becomes zero. Thus, this point of time Td may be detected as the end of radiation. Also in this method, the voltage signal from such a high-sensitivity element SDP that has the highest effective sensitivity (e.g. the high-sensitivity elements SDP 2 in the directly-irradiated area) will serve for the detection of radiation with higher accuracy.

Although the start and end of radiation are detected by the most sensitive one of the selected high-sensitivity elements SDP (i.e. the high-sensitivity element SDP 2 in the example of FIGS. 5 and 6) in the above first to third embodiments, it is possible to detect the start of radiation or the end of radiation using multiple high-sensitivity elements SDP in combination. For example, the start of radiation may be detected as a point of time when voltage signals Vout of half the high-sensitivity elements SDP or more reach or exceed the threshold level Th; the end of radiation may be detected as a point of time when voltage signals Vout of half the high-sensitivity elements SDP or more get less than the threshold level Th. Alternatively, an average of voltage signals Vout of all high-sensitivity elements SDP may be compared with a threshold level to detect the start and end of radiation.

In the above first to third embodiments, a predetermined number of high-sensitivity elements SDP are selected from among the detective pixels DP in the order from highest level of their voltage signals Vout (i.e. from highest sensitivity). The method of selecting the high-sensitivity elements SDP from among the detective pixels DP is not limited to this. For example, the high-sensitivity elements SDP may be selected by means of comparison of voltage signals Vout of the detective pixels DP with a threshold level predetermined for judging the pixels as high sensitivity.

While the start of radiation and the end of radiation are detected using digitalized voltage signals Vout of the detective pixels DP, including the high-sensitivity elements SDP, in the above first to third embodiments, the controller 54 may obtain analog voltage signals from the detective pixels DP and the high-sensitivity elements SDP.

Although the above first to third embodiments have been described with regard to the indirect-conversion type FPD 25, the present invention is applicable to a radiographic system using a direct-conversion type radiographic image detector or FPD.

What is claimed is:
1. A radiographic image detector comprising: an imaging device having an imaging area, in which pixels for generating electric signals corresponding to radioactive rays incident thereon are arrayed in a matrix and signal lines for reading out the electric signals from the pixels are provided, to detect an image of a subject from radioactive rays which are incident on the imaging area after penetrating the subject;
 a plurality of detective elements arranged in the imaging area, the detective elements outputting electric signals corresponding to radioactive rays incident thereon;
 a storage device storing previously stored sensitivity data on the detective elements for selecting at least a high-sensitivity element from among the detective elements;
 a radiation detecting device for detecting at least one of the start of radiation and the end of radiation of radioactive rays toward the imaging area by monitoring the electric signal output from the high-sensitivity element selected on the basis of the sensitivity data; and
 a control device for controlling operation of the imaging device on the basis of results of detection by the radiation detecting device.

2. The radiographic imaging device according to claim 1, wherein the imaging area is divided into sections, the divided sections individually containing at least one of the detective elements, and at least a high-sensitivity element is selected in each of the sections.

3. The radiographic imaging device according to claim 2, wherein the radiation detecting device judges an irradiated portion in the imaging area by monitoring electronic signals output from the high-sensitivity elements or the detective elements, and detects the start or the end of radiation of the radioactive rays by monitoring electric signals output from those high-sensitivity elements which are located within the irradiated portion.

4. The radiographic imaging device according to claim 2, wherein the sections are provided by dividing the imaging area into parallel elongated zones or squares.

5. The radiographic imaging device according to claim 1, wherein the detective elements have a structure substantially equal to that of the pixels except but the detective elements are always short-circuited to the signal lines, and the radiation detecting device monitors the electric signals from the detective elements through the signal lines.

6. The radiographic imaging device according to claim 1, wherein the sensitivity data is obtained through a calibration and the high-sensitivity element is previously selected from the detective elements before the imaging device is actuated to image the subject.

7. The radiographic imaging device according to claim 6, wherein the high-sensitivity element is selected on the basis of electric signals obtained from the detective elements during a gain calibration that is carried out for adjusting gains on the individual electric signals from the pixels and the detective elements in order to compensate for variations in sensitivity between the pixels and the detective elements.

8. The radiographic imaging device according to claim 1, wherein more than one high-sensitivity element is selected from the detective elements, and the radiation detecting device concurrently compares the electric signals from the high-sensitivity elements with a predetermined threshold level, to detect a point of time as the start of radiation when any one of the electric signals from the high-sensitivity elements reaches or exceeds the threshold level.

9. The radiographic imaging device according to claim 8, wherein the radiation detecting device detects the end of radiation by monitoring the electric signal of one high-sensitivity element, which has reached or exceeded the threshold level the earliest on detecting the start of radiation.

10. A method of controlling a radiographic image detector comprising an imaging device having an imaging area, in which pixels for generating electric signals corresponding to radioactive rays incident thereon are arrayed in a matrix and signal lines for reading out the electric signals from the pixels are provided, to detect an image of a subject from radioactive rays which are incident on the imaging area after penetrating the subject, the method comprising the steps of:

selecting at least a high-sensitivity element from among a plurality of detective elements which are arranged in the imaging area to output electric signals corresponding to radioactive rays incident thereon;

detecting at least one of the start of radiation and the end of radiation of radioactive rays toward the imaging area by monitoring the electric signal output from the selected high-sensitivity element; and controlling operation of the imaging device on the basis of the detected start or end of radiation.

* * * * *